United States Patent
Reid

(10) Patent No.: US 6,219,930 B1
(45) Date of Patent: Apr. 24, 2001

(54) APPARATUS AND METHOD OF USE FOR CALCULATING AN ESTIMATE OF DAMAGED SURFACE REPAIR COST

(75) Inventor: Mark Reid, Circle Pines, MN (US)

(73) Assignee: Randall M. McPherson, Wayzata, MN (US)

( * ) Notice: Subject to any disclaimer, the term of this patent is extended or adjusted under 35 U.S.C. 154(b) by 0 days.

(21) Appl. No.: 09/216,366

(22) Filed: Dec. 18, 1998

Related U.S. Application Data

(60) Provisional application No. 60/076,267, filed on Feb. 27, 1998.

(51) Int. Cl.⁷ ............................... G01B 3/14; B43L 7/00; G01D 21/00; G06F 17/60; G06F 17/00
(52) U.S. Cl. .............................. 33/562; 33/1 BB; 33/121; 33/566; 33/600; 705/400; 705/29
(58) Field of Search ................... 33/1 BB, 121, 33/562, 563, 566, 600; 705/29, 30, 400

(56) References Cited

U.S. PATENT DOCUMENTS

| | | | |
|---|---|---|---|
| 2,623,291 | * 12/1952 | Hay et al. ............................ | 33/1 BB |
| 2,623,292 | * 12/1952 | Hay et al. ............................ | 33/1 BB |
| 3,029,522 | 4/1962 | Stolle .................................... | 33/174 |
| 3,890,715 | * 6/1975 | Kaplin ................................. | 33/1 BB |
| 4,131,998 | * 1/1979 | Spears ................................. | 33/1 BB |
| 4,353,988 | * 10/1982 | Couse et al. ........................ | 33/1 BB |
| 4,389,782 | * 6/1983 | Webster .............................. | 33/1 BB |
| 4,435,769 | 3/1984 | Nagano et al. ..................... | 364/464 |
| 4,507,872 | 4/1985 | Schermann ......................... | 33/174 |
| 4,517,748 | * 5/1985 | Rudolph et al. ................... | 33/562 |
| 4,896,428 | * 1/1990 | Peterson ............................. | 33/1 BB |
| 5,128,859 | 7/1992 | Carbone et al. .................... | 364/401 |
| 5,293,309 | * 3/1994 | Sakai et al. ......................... | 705/29 |
| 5,317,503 | 5/1994 | Inoue .................................. | 364/400 |
| 5,377,098 | 12/1994 | Sakai .................................. | 364/406 |
| 5,491,902 | * 2/1996 | Uhrin et al. ........................ | 33/563 |

FOREIGN PATENT DOCUMENTS

| 88609 | * 5/1983 | (JP) | .................................. | 33/562 |
|---|---|---|---|---|
| 1651084 | * 5/1991 | (SU) | .................................. | 33/121 |

* cited by examiner

*Primary Examiner*—Randy W. Gibson
(74) *Attorney, Agent, or Firm*—Larkin, Hoffman, Daly & Lindgren, Ltd.; John F. Klos

(57) ABSTRACT

A method of use and apparatus for estimating repair cost, particularly applicable to cost estimation of interspaced defect damaged vehicle surfaces. The method of use of the present invention provides that a defect count be made for a predetermined representative area; that a determination of relative severity be made with respect to at least one defect within the representative area; and that the repair estimate is then based upon the defect count information and defect severity. A set of physical templates may be provided, with a first template allowing the calculation of the number of dents per surface area, and a second template for grading, comparing, or otherwise determining the size or severity of the individual dents. Additionally, the defect count data and defect severity data may be determined with an electronic scanning means. Various formulae may be employed (manually or electronically) for calculating the cost estimate to repair the damaged surface.

8 Claims, 4 Drawing Sheets

APPARATUS AND METHOD OF USE FOR CALCULATING AN ESTIMATE OF DAMAGED SURFACE REPAIR COST

CROSS REFERENCE TO RELATED APPLICATIONS

This application claims the benefit of priority pursuant to 35 USC §119(e)(1) from the provisional patent application filed pursuant to 35 USC §111(b): as Ser. No. 60/076,267 on Feb. 27, 1998.

FIELD OF THE INVENTION

The present invention relates to a method for estimating the cost to repair damaged surfaces, and more particularly to a method for estimating the repair cost of vehicles damaged by environmental action, such as hail.

BACKGROUND OF THE INVENTION

Damage to vehicle surfaces from hail or other icy precipitation is typically manifested as randomly dispersed symmetrical and concavely-shaped depressions or dents. Motor vehicles subject to such damage may suffer a substantial loss in value, and as a result, it may be desirable to repair such a hail damaged vehicle. One approach to repairing hail damage is to simply replace a damaged panel with a new panel and finish the panel to match the existing panels. Yet another approach to repairing hail damage is to apply a hardening fill material (e.g., Bondo®) in a hail dent depression, sand and prep the defect area, and then refinish the area to match. Both of these approaches are time inefficient and expensive, since extraneous panel surface areas are refinished. Another approach to repairing hail damaged surfaces is a technique referred to as "paintless dent repair" or PDR. Using the PDR technique, a repair technician manipulates elongate tools to bias or otherwise force the dented metal back into shape from the reverse side of the panel. Most significantly, the previously damaged panel need not be refinished as the paint associated with the dent typically remains intact.

Paintless dent repair is an inherently labor intensive repair process, as little or no replacement of parts or additional supplies may be required during the repair. However, it has been difficult to accurately and uniformly estimate the time and cost to repair hail damaged motor vehicles using the paintless dent repair technique as the time and cost of this type of repair varies widely depending on the number and relative severity of the dents. Estimates have traditionally been "best guess" approximations, which may vary dramatically between repair facilities. At the present time, there is a need for effective and precise means for calculating an estimate of the time to repair a hail damaged vehicle. This need is particularly significant to insurers, as an insurance claim adjuster may have a very short time to review and estimate each damaged vehicle.

SUMMARY OF THE INVENTION

An aspect of the present invention provides a method for rapidly and reliably estimating the repair time and cost for vehicles damaged by hail. Another aspect of the present invention provides a first damage grading template that can be positioned over a portion of the damaged vehicle and which allows the user to determine the number of defects per representative unit area of the damaged surface. A second template may then be used to grade the severity of the dents within the representative area against a predetermined comparison scale. The surface area of the vehicle panels can be estimated, measured, or determined from a look-up chart with reference to the particular make and model of car. An estimate of repair time can then be based upon the number of dents of various grades within the representative area and the panel surface area data. The total repair labor cost can be calculated based upon the shop labor rate.

The present invention provides templates for determining damage data on a motor vehicle. In particular, the damage data may be provided by a plurality of templates: a first template for use in determining the number of dents within a representative area of a vehicle surface, and a second template for determining the relative severity of individual dents within the representative area. The estimating system is desirable to insurers since it promotes uniformity and standardization of paintless dent repair estimates among repair facilities.

The present invention additionally provides an electronic-based system for determining damage data on a motor vehicle. An electronic scanning means may be used to both count the number of dents within a representative area of a vehicle surface and determine the relative severity of one or more individual dents within the representative area.

DESCRIPTION OF THE PREFERRED EMBODIMENTS

Figure 1:
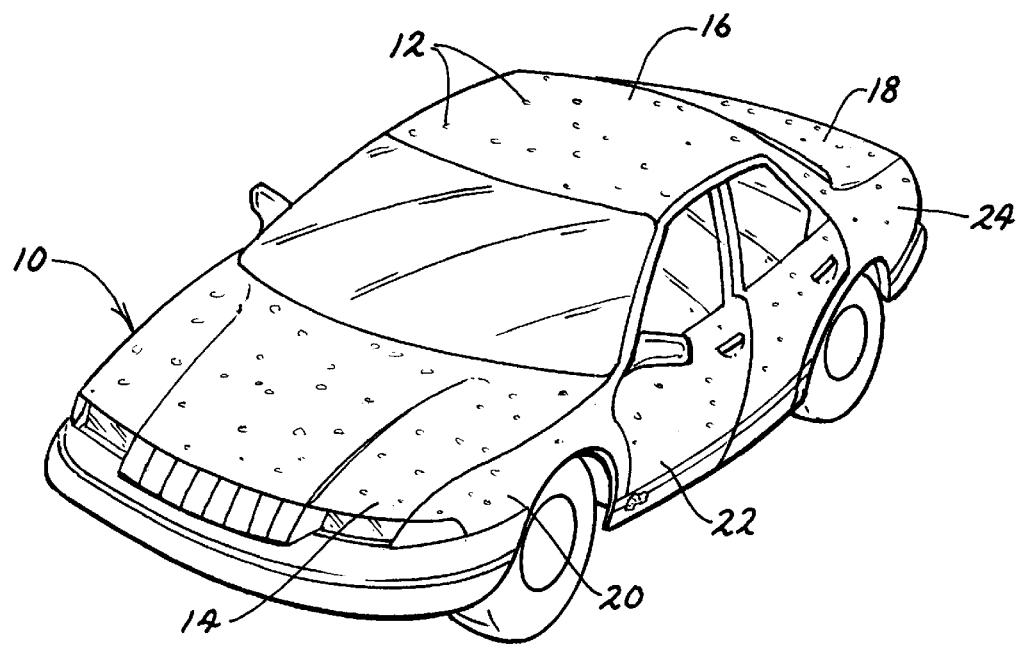
FIG. 1 shows the perspective view of an automobile having a plurality of surface defects, which may be hail dents.

Referring to FIG. 1, an automobile 10 in a damaged conditioned is illustrated having a plurality of surface defects 12. One type of surface defects 12 may be dents or concave depressions caused by rapidly descending hail or icy precipitation. As illustrated in FIG. 1, hail damage typically results in a majority of the damage occurring on the large, generally horizontal surfaces of the vehicle 10, e.g., the hood 14, roof panel 16, and rear trunk lid panel 18. To a lesser extent, the front fenders 20, the doors 22, and the rear quarter panels 24 have similarly been damaged. The surface dents 12 may have varying degrees of depth and diameter, depending on the hail's speed, composition, other physical characteristics, and the vehicle's physical characteristics (construction materials, structural geometry, etc.). However, as a general rule, hail dent depth is related to its dent diameter: a "deeper" hail dent will typically present a larger diameter at the surrounding panel surface. As illustrated in the drawings, hail dents 12 are typically concavely-shaped and circular when viewed from above. Therefore, one aspect of the present invention promotes the use of hail dent diameter to provide a measure of dent grade or severity.

Figure 2:
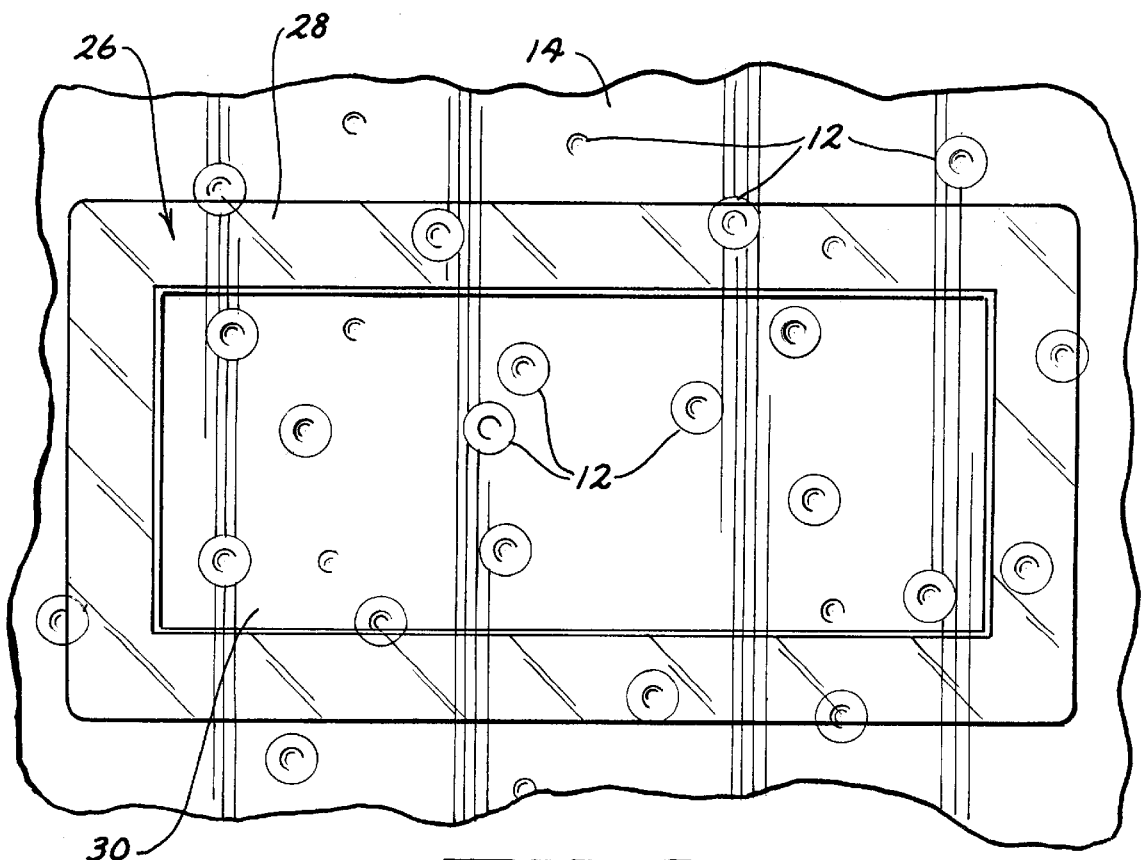
FIG. 2 illustrates a first defect number-calculating template of the present invention.

FIG. 2 illustrates a first defect guide or template 26 of the present invention. The first template 26 is illustrated as having been placed upon a damaged hood panel 14 of the vehicle 10. The template 26 is formed with a rectangular frame 28 which encloses a transparent central region 30 through which the user may visually inspect the damaged surface 14 of the vehicle 10. The central region 30 may be an aperture of the frame 28 and may include a transparent sheet, screen, or film. The first template 26 is preferably flexible so that it may conform to the surface of the vehicle 10 and may advantageously be made of a magnetic plastic which secures to the surface of the vehicle 10. The central region 30 of the template 26 defines a unit reference area, or representative area which may be approximately 1 square foot. As will be described hereinafter in the description of use of the present invention, when the first template 26 is placed on a vehicle 10 surface, the user may quickly determine the number of dents 12 per representative area by simply counting the dents 12 contained within the central region 30 of the first defect template 26 positioned upon a surface of the vehicle 10. If desired, an estimate of the total number of dents 12 on the vehicle surface may be made by multiplying the number of dents 12 per square foot (number of dents 12 within the central region 30 of the first template 26) by the total square footage of the vehicle's horizontal surfaces (assuming that the number of dents within the central region 30 of the positioned template 26 represents an average across the vehicle surfaces).

Figure 3:
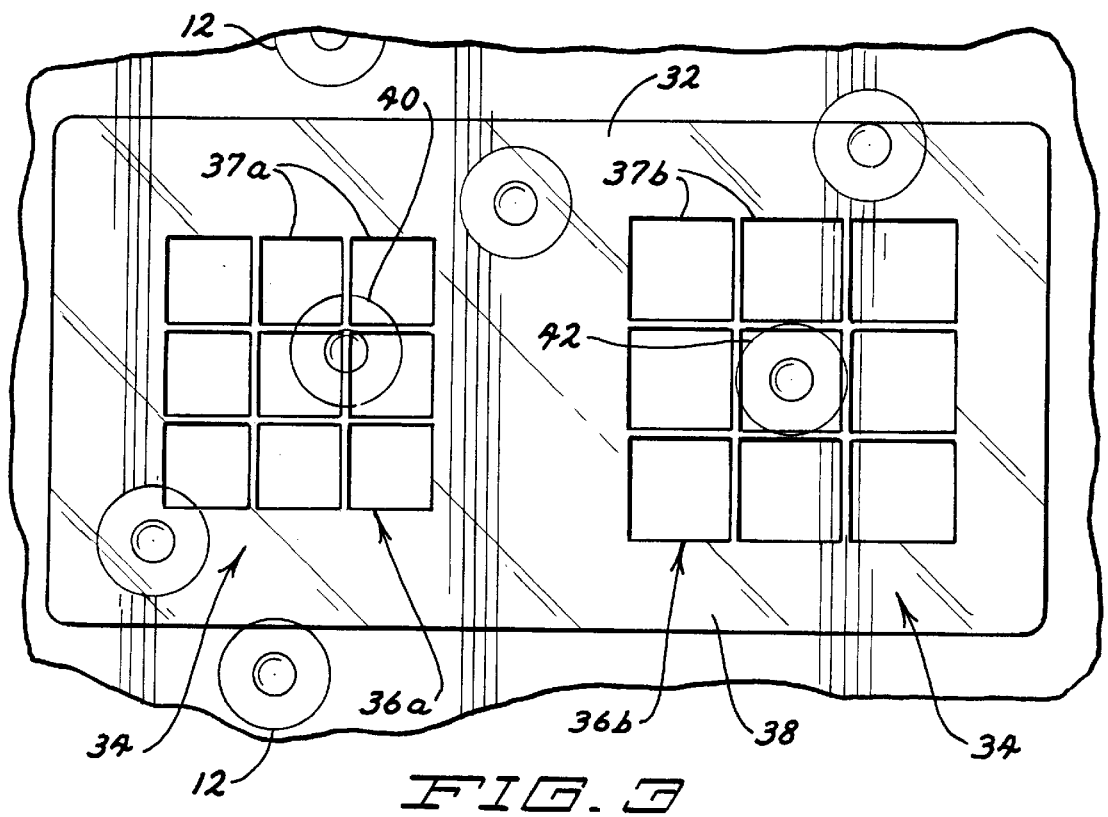
FIG. 3 illustrates a second defect size or severity grading or classifying template of the present invention.

Referring now to FIG. 3, the second guide or template 32 of the present invention is illustrated. The second template 32 includes a plurality of indicia 34 for determining the relative dent severity. Since dent diameter is typically related to dent depth, the plurality of indicia 34 may be used to relate or compare dent diameter as a measure of defect severity. The determining indicia 34 may be apertures 37 in the template 32 body 38 as illustrated or other indicia (grids, scales, etc.) on transparent media, for example. The second template 32 of the present invention includes a pair of aperture arrays 36a, b which may be used to gage the dent diameter. A first array of apertures 36a includes a plurality of apertures 37a of substantially equal area, each of which are sized to correspond to relatively small defect severity. The second array of apertures 36b includes a plurality of apertures 37b of substantially equal area which are larger than the apertures 37a of the first array 36a and sized to correspond to relatively larger defect severity. Each array of apertures 36a, b is illustrated as an 'n×n' array of generally square-apertured elements 37. Alternatively, the apertures 37 corresponding to small and large dent size may be arranged in a variety of configurations, i.e., linearly, etc., and the aperture shapes may assume other forms, i.e., circular, triangular, etc. A single template may include more than two aperture arrays 36, for instance, three differently sized arrays 36 may be used to grade or classify the severity of hail dents as "small", "medium", or "large" defects. In one embodiment of the present invention, the dimensions of the individual apertures 37a of the first array 36a are approximately 1 inch squared while the dimension of the second array 36b apertures 37b are approximately 1.75 inches by 1.75 inches.

Still referring to FIG. 3, the second template 32 may be formed from a flexible, generally transparent material which the user may place on the vehicle 10 and move about the surface of the vehicle 10 to visually determine the relative size of the defects 12. As illustrated in FIG. 3, the dent diameter of two substantially equal sized dents 40, 42 may be visually compared against the apertures 37 of the first and second arrays 36a, b. The dent 40 is larger than the apertures 37a of the first array 36a, but approximately equally sized to the apertures 37b of the second array 36b. Thus, these dents 40, 42 may be classified or graded as "large" dents.

Figure 4:
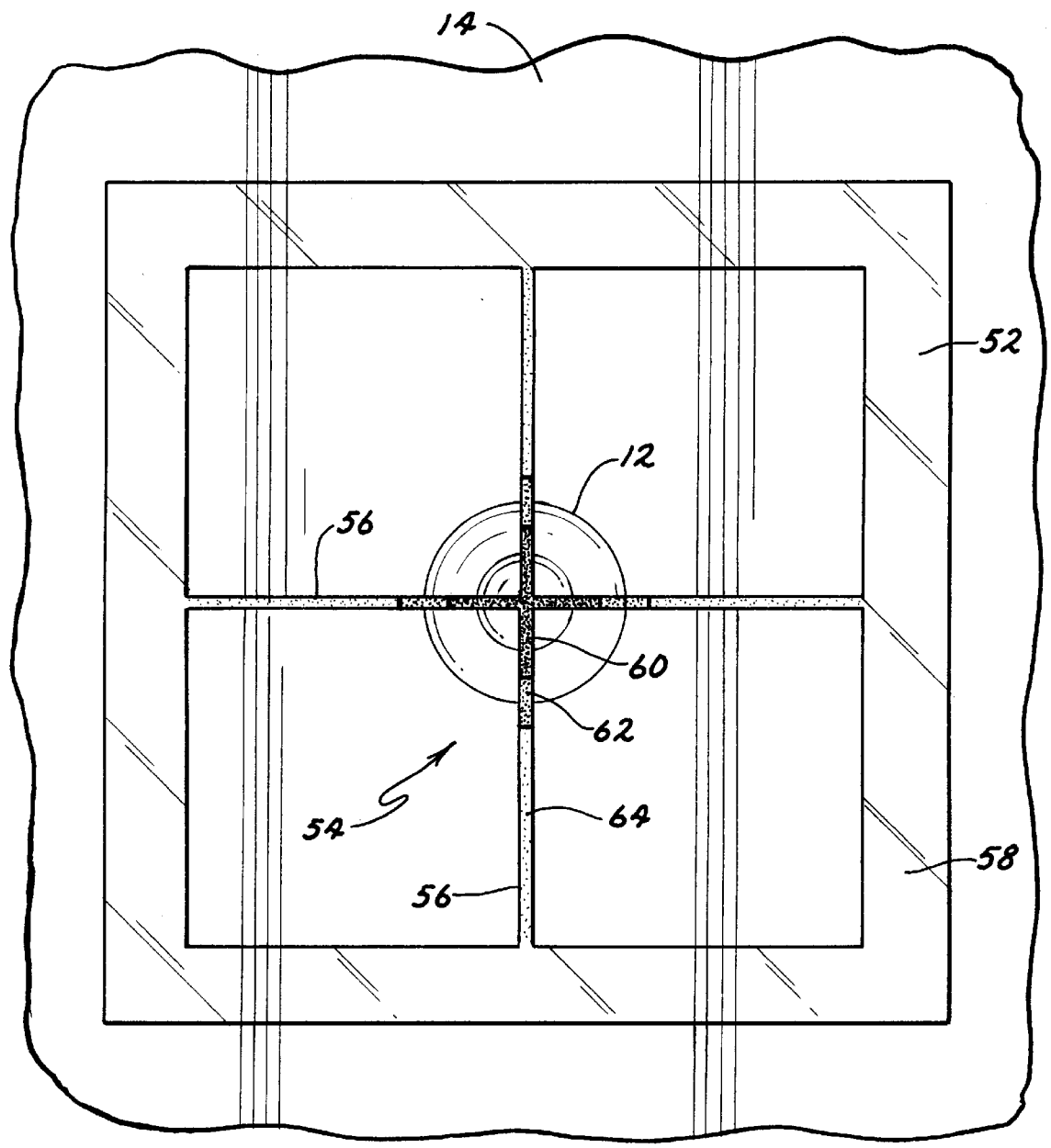
FIG. 4 illustrates yet another embodiment of a defect-grading template according to the present invention.

Referring now to FIG. 4, another embodiment of the second defect-grading template 52 of the present invention is illustrated. The second template 52 includes an indicia 54 for determining the relative dent severity. Since dent 12 diameter is typically related to dent 12 depth, the indicia 54 may be used to relate or compare dent 12 diameter as a measure of defect severity. The determining indicia 54 may be cross-hair members 56 in the template 52 body 58. In one embodiment, the template 52 may be made from a transparent media. The cross-hair members 56 of the template 52 includes markings 60, 62, 64 associated with the center of the template 52 which may be used to gage the dent 12 diameter. The markings 60, 62, 64 may be color-coded and include a first colored marking 60 which is sized to correspond to relatively small dent severity, a second colored marking 62 which corresponds to a relatively larger dent, and a third colored marking 64 which corresponds to a yet relatively larger dent. Dent severity may be determined by centering the template 52 on a hail dent 12, as illustrated in FIG. 4, and visually comparing the dent 12 with the indicia 54, including the markings 60, 62, 64, of the cross-hair members 56. The dent 12 of FIG. 4 may be characterized as a "medium" sized dent as it falls within the second marking 62.

Figure 5:
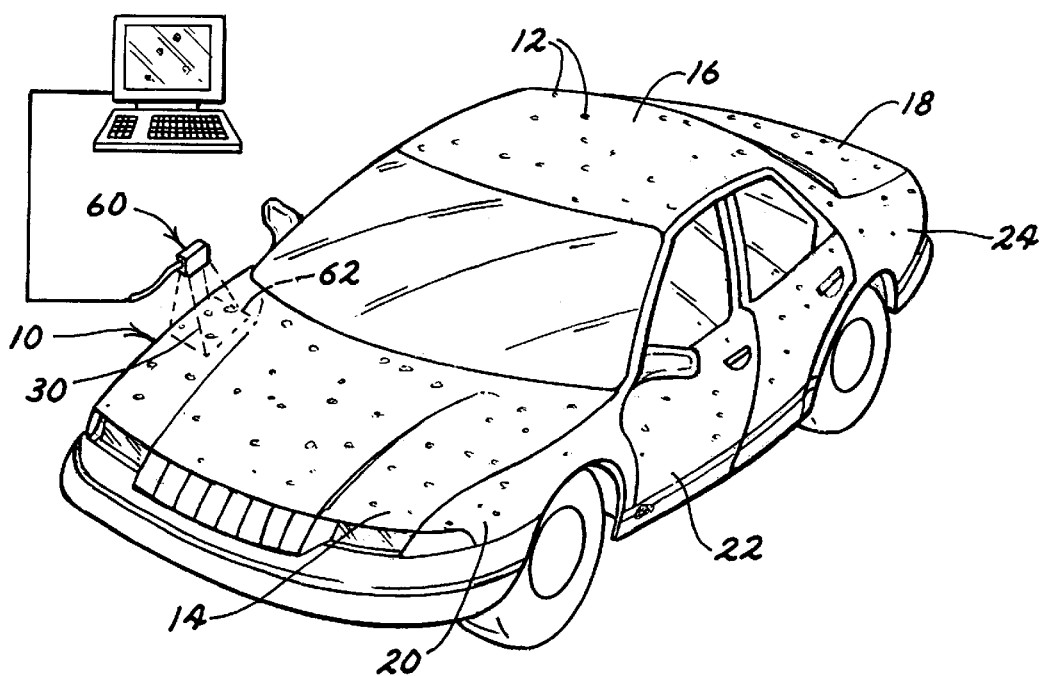
FIG. 5 is a perspective view of an electronic embodiment of the present invention.

Referring now to FIG. 5, another embodiment of the present invention is illustrated. A scanning means 60 and associated computer or microprocessor may be used to determine both the count data (number of dents per representative area 30) and the dent severity data for one or more dents within the representative area 30. As will be described hereinafter, the templates of this embodiment may be 'virtual' templates, i.e., the scanning means and associated computer or microprocessor establish and define the representative area without the use of physical templates 26, 34.

To calculate an estimate of the time and cost associated with paintless dent repair of a hail damaged vehicle according to the present invention, the following procedure may be used:

The first estimating template 26 is placed upon the damaged panel to determine the number of dents 12 per representative square foot area. The user may place the first template 26 over a pre-selected area which has a representative or "average" amount of hail damage. The user may then visually count the number of dents 12 within the representative area (within the central region 30). An average dent 12 count may be determined by sampling at two or more pre-selected areas. Alternatively, as illustrated in FIG. 5, the number of dents may be counted with an electronic means 60, e.g., an optical scanner. Such an optical scanner 60 may be a hand-held or stationary scanner as well known to those skilled in the art. This information of dent count per representative area obtained from either a visual count or an optical scanner 60 count may be recorded on a manual or electronic worksheet or database. Next, the second estimating template 32, 52 is used to determine the relative size of the dents 12 within the pre-selected unit area 30. The second template 32, 52 is positioned over a dent 12 within the pre-selected unit area with the determining indicia 34, 54 centered over the top of the dent 12 to allow the user to visually determine whether the dent 12 is a small or large dent. Alternatively, with reference to the electronic embodiment of the present invention in FIG. 5, the electronic scanning means 60 may be used to determine the relative severity of hail dents. It may be desirable to measure and record only the largest dents 12 on a given panel. Accordingly, not every dent 12 within the preselected area or surrounding region need be graded. This information (dents per unit area and relative size of dents) is subsequently used to compute the damage cost estimate. Additional data, including the surface area of the various body panels, may be measured or otherwise obtained, e.g., via an electronic database. Since the top (horizontal) surfaces 14, 16, 18 of the vehicle 10 are damaged to a greater extent than the side surfaces 20, 22, 24, a plurality of estimation formulae have been devised to account for this difference.

HORIZONTAL SURFACE DAMAGE REPAIR ESTIMATION

Using the first template 26 to determine the number of dents 12 within a preselected square foot area 30 and the second template 32 (or second template 54) to determine the relative size of the larger dents 12 within the preselected area, one can determine whether the panel has "light," "medium," or "heavy" damage. Representative, though not necessarily limiting, examples of light, medium, or heavy damage may be determined as follows:

Light damage: two or fewer small dents per pre-selected representative square foot area (and no large dents).

Medium damage: three to five total dents per pre-selected representative square foot area with less than one dent per square foot.

Heavy damage: six to ten total dents with not more than two large dents per pre-selected representative square foot area.

If there are fewer than one small dent 12 per pre-selected representative square foot area, it may be desirable to use the side surface estimation formula below. If there is more than two large dents per square foot area, the damage vehicle surfaces 14, 16, 18 may not be a suitable candidate for the paintless dent repair method. Replacement of the panel may be necessary.

The next step in the process is to measure the total surface area of a damaged panel 14, 16, 18, i.e the square footage of panel. An approximate calculation can be made by multiplying the panels' length and width dimensions. Alternatively, total surface area of panels may be determined from a look-up table, local or remote electronic database, third party vendor, etc.

The final step in the cost estimation process for damaged top surfaces involves applying an appropriate cost formula. The applicant has determined that the equations below, which while achieving satisfactory results, should not be construed as precise or limiting in value and that a range of multiplier values or even other formulas or equations may be readily appreciated by those skilled in the art.

Light damage formula: (0.5)×(square footage)×(body labor rate)= cost estimate

Medium damage (0.7)×(square footage)×(body labor rate)=cost estimate

Heavy damage: (0.8)×(square footage)×(body labor rate)=cost estimate

Similar calculations are made for each damaged panel of the vehicle.

Side Surface Damage Repair Cost Estimation

Still another estimation approach can be utilized for damaged side surfaces (quarter panels 24, doors 22, fenders 20, etc.). The first step of the estimation process requires that the number of dents 12 on each side surface 20, 22, 24 be counted. An appropriate side surface cost formula may then be applied:

$x.00 per panel plus $y.00 per each additional dent or a maximum of $z.00 per panel.

Exemplary values for x, y, and z are: $50.00, $25.00, and $300.00. Again it is appreciated that these formulas and values are functional examples, not requirements or limiting with regard to practice of the present invention.

Yet another estimation approach can be utilized for side surface 20, 24, 26 repair calculations:

1.0 hour per minimum 0.2 for each additional dent 0.3 added to the total for each dent measured to be large according to the second estimating template 32, 52.

Repair costs are then determined according to the hourly shop labor rate.

Once the top surface and side surface cost estimations have been determined as disclosed above, the total repair cost can be obtained by adding the total top surface estimates for all top surface panels with the total side surface panel estimates.

Referring again to FIG. 5, an electronic embodiment of the present invention is illustrated. An optical scanning means 60 may be used to determine the number of hail dents 12 within a representative area 30 and/or the relative severity of hail dents 12 within the representative area 30. Such scanning devices 60 and associated software are well known to those skilled in the art. In such an electronic embodiment, a first 'template' defining the representative area 30 may be a 'virtual' template 62 implemented by software, etc. In this manner, the scanning system 60 would determine the number of hail dents 12 within a representative area 30 without the use of a physical template 26, but would 'create' or define a 'template' 62 by software or otherwise to delineate a representative area 30. Similarly, the second template 34 for grading dent 12 severity may be a virtual template, with the system software comparing, measuring, or otherwise determining relative dent 12 severity using known software or other techniques. As will be readily appreciated, the computation of horizontal and side surface damage estimates may be made with software, an embedded microprocessor, or related digital computer based implementations (local or remote) known to those skilled in the art.

Figure 6:
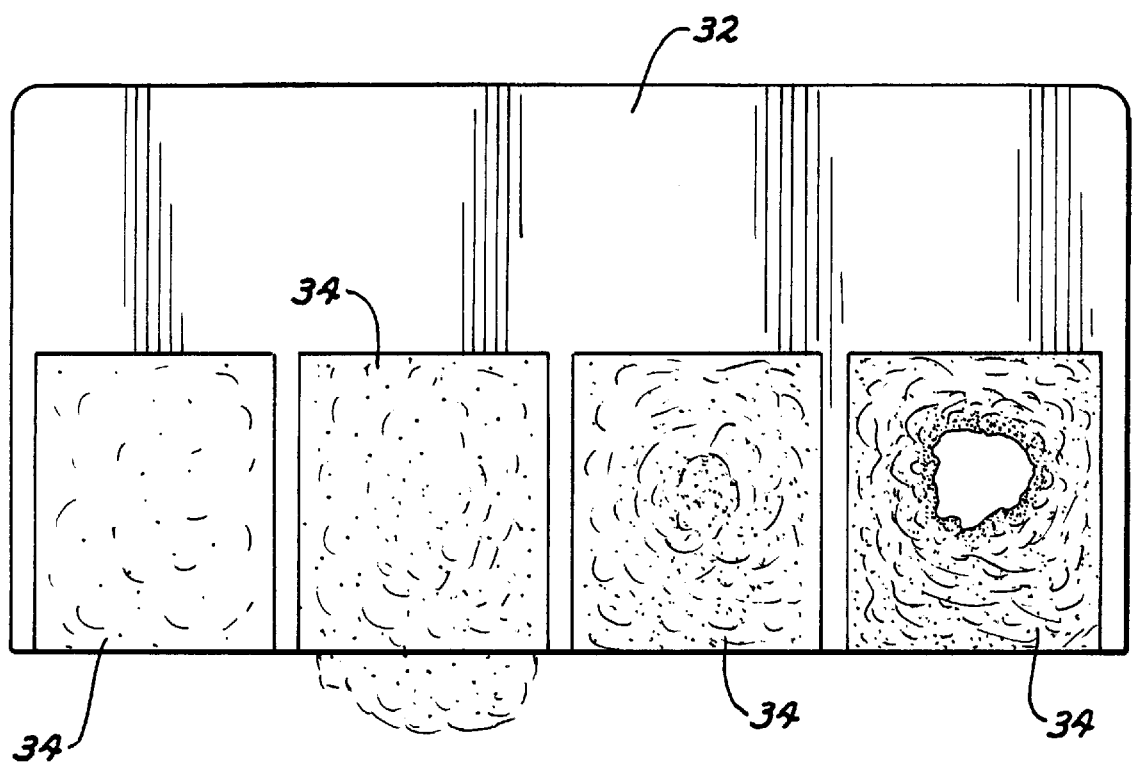
FIG. 6 illustrates another embodiment of a defect-grading template according to the present invention.

Now referring to FIG. 6, which illustrates another second defect severity grading or classifying template 32 where the defect indicia 34 represents light-to-heavy rust scale. This second template 32 may be used in a similar manner to estimate the repair costs for rust repairs on vehicle surfaces. It is appreciated that similar templates may be designed to facilitate other estimation tasks for surface repair, for example, such as barnacle or other sea-life damage on ships or vessels, corrosion damage on aircraft, etc.

While preferred embodiments of the present invention have been described above, other embodiments will be apparent to those skilled in the art, and thus the scope of the present invention is to be limited solely by the terms of the following claims.

What is claimed is:

1. A method of estimating the time required to repair a surface damaged with interspaced defects, said method comprising the steps of:

selecting a predetermined location on the surface;

obtaining a first template defining a representative area;

placing the first template adjacent to the surface at the predetermined location;

determining a number of defects within the representative area of the first template at the predetermined location;

obtaining a second template which includes at least one damage indicia relating to a defect severity;

determining a relative severity of at least one of said plurality of defects contained within the representative area of the first template at the predetermined location with reference to the at least one damage indicia; and performing a mathematical process with a representative area data, the number of the defects within the representative area, and the relative severity of said at least one of said plurality of defects contained within the representative area of the first template in the predetermined location to determine the estimate of the time required to repair the surface.

2. A method of estimating the time required to repair a vehicle surface damaged with interspaced defects according to claim 1, wherein the step of determining the relative severity of at least one of said plurality of defects contained within the representative area of the first template in the predetermined area is satisfied with respect to a largest defect within said representative area.

3. A method of estimating the time required to repair a surface damaged with interspaced defects according to claim 1, wherein the second template includes at least one damage indicia relating to a defect diameter, and the step of determining the relative severity of at least one of the plurality of defects includes a comparison of a defect diameter with said defect diameter damage indicia.

4. A method of estimating the time required to repair a surface damaged with interspaced defects according to claim 1, wherein the step of performing the mathematical process is performed electronically.

5. A method of estimating the time required to repair a surface damaged with interspaced defects according to claim 1, wherein the first template includes a rectangular frame and a single aperture defining the representative region within said frame.

6. A method of estimating the time required to repair a surface damaged with interspaced defects according to claim 1, wherein the damage indicia relating to defect severity is a pair of arrays, each array including a plurality of apertures.

7. A method of estimating the time required to repair a surface damaged with interspaced defects according to claim 1, wherein the damage indicia relating to defect severity is either: a) at least a pair of differently sized apertures, or b) a cross-hair member.

8. A method of estimating the time required to repair a surface damaged with interspaced defects according to claim 1, wherein the step of performing a mathematical process includes the step of entering a count data and a severity data into an electronic worksheet.

* * * * *